Oct. 25, 1966 M. P. YOUNG 3,281,700

SIGNAL POLARITY SELECTOR

Filed June 30, 1949 5 Sheets-Sheet 1

Inventor
MARVIN P. YOUNG

By M. A. Hayes

ATTORNEY

Oct. 25, 1966 M. P. YOUNG 3,281,700

SIGNAL POLARITY SELECTOR

Filed June 30, 1949 5 Sheets-Sheet 2

Inventor
MARVIN P. YOUNG

By M. A. Hayes

ATTORNEY

Inventor
MARVIN P. YOUNG

By M. A. Hayes

ATTORNEY

Oct. 25, 1966 M. P. YOUNG 3,281,700

SIGNAL POLARITY SELECTOR

Filed June 30, 1949 5 Sheets-Sheet 4

Inventor
MARVIN P. YOUNG

By M. C. Hayes

ATTORNEY

Oct. 25, 1966 M. P. YOUNG 3,281,700

SIGNAL POLARITY SELECTOR

Filed June 30, 1949 5 Sheets-Sheet 5

Inventor
MARVIN P. YOUNG

By M. O. Hayes
ATTORNEY

United States Patent Office 3,281,700 Patented Oct. 25, 1966

3,281,700
SIGNAL POLARITY SELECTOR

Marvin P. Young, % Naval Research Laboratory, Anacostia Station, Washington, D.C.

Filed June 30, 1949, Ser. No. 102,183
6 Claims. (Cl. 328—118)

This invention relates to electrical pulse signal translating apparatus and in particular to electronic commutating devices for switching time succedent pulse signals into different pulse transmission channels while at the same time eliminating from the input pulse train those pulses of an unwanted polarity.

In many applications of electrical information storage and calculating equipment it is necessary to transmit information positively to control the operation of some apparatus at a distant point. Since some form of energy repeater or relay system is generally employed, suitable signal operative devices are necessary. Information is generally conveyed in numerical form but the decimal system as normally used is not readily handled by electrical apparatus such as relays, electrical counters and the like. Each decimal digit requires ten conditions to represent it whereas a simple relay can usually be either open or closed with no reliable in-between position. So that such two position apparatus can be simply employed it is possible to employ a completely different system of numbers known as the binary system in which only two conditions represent each digit of the number.

For illustration the decimal numerals 0 to 15 may be mathematically represented by the following binary digit combinations:

| Decimal: | Binary |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| 10 | 1010 |
| 11 | 1011 |
| 12 | 1100 |
| 13 | 1101 |
| 14 | 1110 |
| 15 | 1111 |

As noted from the above table each digit in the binary number has two values or conditions (0) or (1).

The binary system is particularly useful where electronic counting is employed because a sequentially connected group of trigger circuits such as a type having two stable states can be employed to sense a quantity of pulse type signals and easily register them. One counter state can be used to signify the binary condition (0) and the other counter state the binary value (1).

In numerous applications of pulse signal operative circuits it is desirable to transmit information in binary form. Binary information can be obtained simply as two signal conditions, typically the presence and absence of a pulse signal at a prescribed instant of time, but this simple type system offers certain disadvantages. In such a system a time measuring element is required to determine whether the absence of a pulse of energy indicates merely a time spacing between recurrent pulse positions or an actual binary condition at one of the positions.

A positive way of indicating binary conditions is to produce a pulse signal of one polarity for one binary condition and a pulse signal of the opposite polarity for the other binary condition, thus there will always be a definite indication of the condition and no time lapse measuring or other equipment will be required to determine exactly the meaning of a missing signal.

It is therefore an object of the present invention to provide pulse signal translating equipment which will receive pulse signals of opposite polarities to indicate two binary conditions and provide a pulse signal output for only one of the conditions.

Another object of the present invention is to provide pulse signal conversion equipment which will effect conversion of pulse signals occurring in time displacement into pulses of one polarity occurring coincident in time.

Another object of the present invention is to provide an electronic switching system for switching time succedent pulse signals into different pulse transmission channels while at the same time eliminating from the input pulse train those pulse signals of an unwanted polarity.

Other and further objects and features of the present invention will become apparent upon a careful consideration of the accompanying drawings and detailed description.

In accordance with the broad aspects of the present invention, pulse signal responsive apparatus is provided operative to distinguish between negative and positive polarity input pulses of recurrent binary pulse groups and provide an output only for pulses of a selected polarity. The apparatus operates first by differentiating input pulses of compartively long duration to obtain from each long pulse two short duration pulses. Where the input pulses are positive the first short duration pulse obtained is positive and the second negative. Where the input pulses are negative the first short duration pulse obtained is negative and the second is positive.

The short duration pulses thus obtained are first subjected to shaping in which the positive ones are inverted to provide a first series of negative control pulses and the negative ones are provided with amplification without inversion as a second series of negative control pulses.

The first series of control pulses is applied to a first chain trigger circuit or sequencer which may have a number of stages equal to the number of pulses in each group. The output from the sequencer is employed to individually control a series of gated amplifiers. The second series of control pulses goes to a second sequencer similar to the first. The output from this second sequencer is obtained as differentiated positive pulses and is also delivered individually to the gated amplifiers.

Bias on each tube of the gated amplifiers is set so that it is non-conductive except when the positive pulse delivered thereto from the second sequencer occurs after the corresponding stage of the first sequencer is operated by the preceding leading edge of a positive input pulse. Thus they produce output signals only when a pulse of the first series occurs before the corresponding pulse of the second series. Such a condition can exist only for original input pulses of positive polarity.

The information thus sequentially obtained may be stored in trigger circuits and later delivered simultaneously for utilization.

Figure 1:
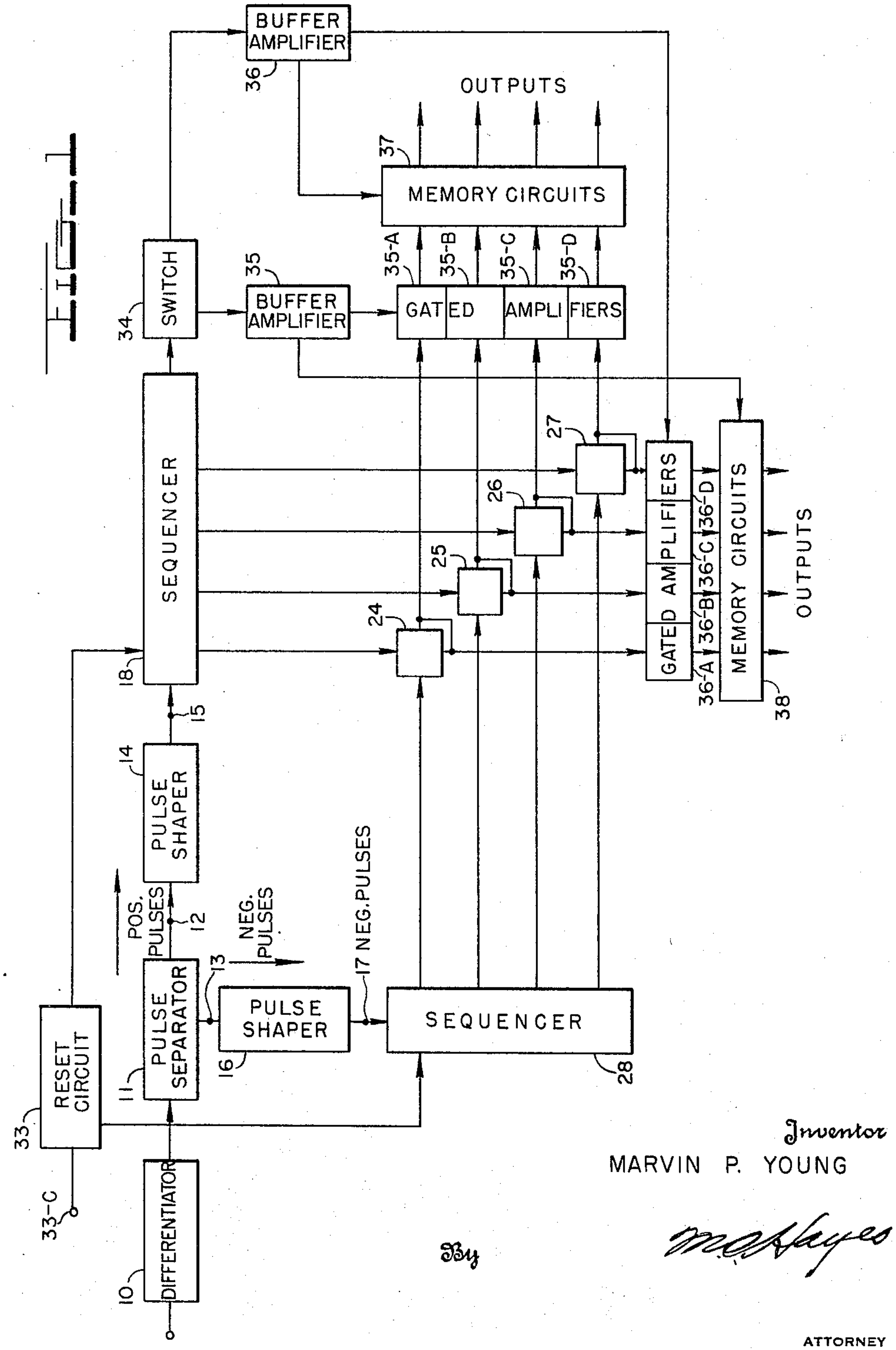
FIG. 1 shows a block diagram of apparatus constructed in accordance with the teachings of the present invention.
Figure 2:
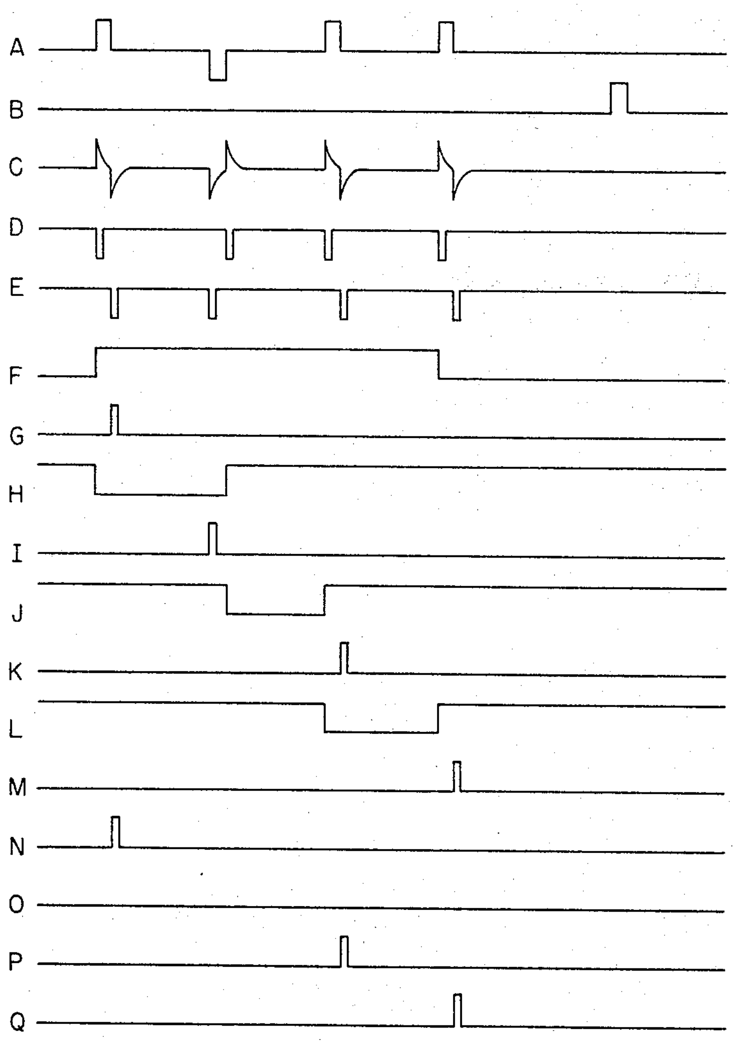
FIG. 2 shows waveforms typifying the signals present at various points in the apparatus of the subject invention.

With particular reference now to the block diagram of FIG. 1, and to FIG. 2, a series of positive and negative pulse type signals as typified in waveform A of FIG. 2 is supplied to the differentiator circuit 10 producing the differentiated pulse signals of waveform C in FIG. 2.

As shown by the waveform, each positive pulse supplied to the differentiator produces a short positive pulse followed by a short negative pulse. Similarly each negative pulse produces a short sharp negative pulse followed by a short positive pulse.

The signal as shown by waveform C in FIG. 2 is applied to pulse separator 11 which is a combination of biased circuits arranged to deliver the positive differentiated pulses to point 12 and the negative differentiated pulses to point 13. Pulse shaper 14 receives the positive pulses from point 12 then amplifies and inverts them to produce negative pulses as shown by waveform D of FIG. 2 which are applied to point 15. Pulse shaper 16 receives the negative pulses from point 13, amplifies them and supplies them as negative pulses to point 17. These negative pulses are indicated by waveform E of FIG. 2.

Figure 3:
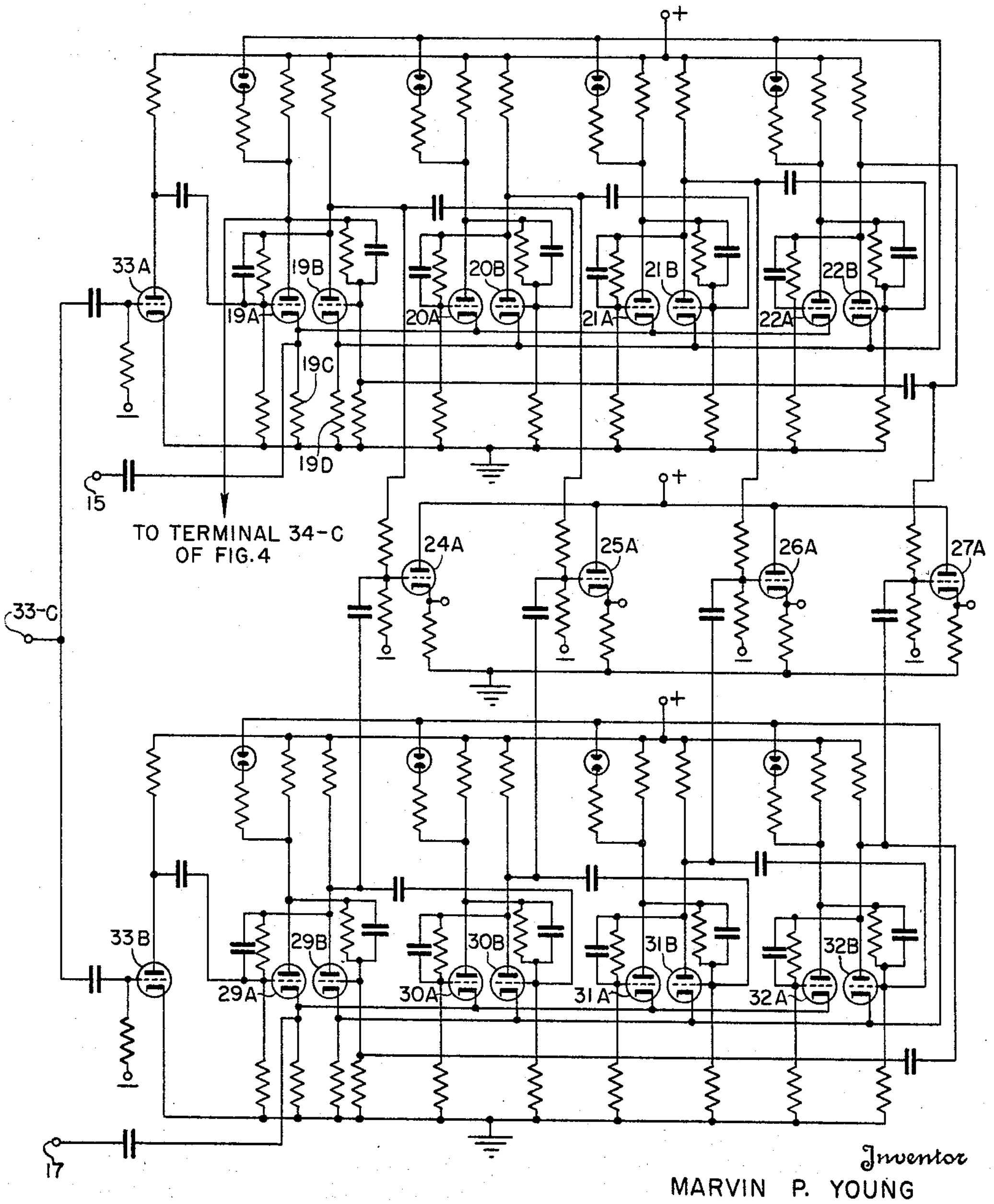
FIGS. 3, 4 and 5 show in schematic form various parts of the apparatus of FIG. 1.

Negative pulses from point 15 are applied to a sequencer 18 typically a four-stage ring counter (as in FIG. 3 having tubes 19–A, 19–B, 20–A, 20–B, 21–A, 21–B, 22–A, 22–B with a reference condition wherein tubes 19–B, 20–A, 21–A, 22–A are conducting). In response to a typical first negative signal appearing at point 15, waveform D (FIG. 2) the sequencer 18 delivers a positive enabling voltage level to a gated amplifier circuit 24 and removes a positive enabling voltage level from gated amplifier circuit 25. A second negative input pulse to sequencer 18 returns the positive enabling voltage level to the second gated amplifier circuit 25 and removes the positive voltage from a third gated amplifier 26. Similarly a third negative pulse delivered to sequencer 18 returns the positive enabling voltage level to gated amplifier circuit 26 and removes it from the fourth gated amplifier 27 and a fourth negative signal causes the return of the positive enabling voltage level to gated amplifier circuit 27. These four positive enabling voltage levels with their time relationships are indicated in FIG. 2 by the raised portions of waveforms F, H, J, and L, respectively.

The gated amplifier circuits 24, 25, 26, 27 are also supplied with positive signals from a second sequencer 28 which in construction is almost an exact duplicate of the sequencer 18. Sequencer 28 as shown in FIG. 3 has the tubes 29–A, 29–B, 30–A, 30–B, 31–A, 31–B, 32–A, 32–B. The positive signals from sequencer 28 are supplied as short pulses through suitable differentiator circuits responsive to the negative pulses at point 17 shown by waveform E. The short positive signals from sequencer 28 together with their time relationships are indicated by waveforms G, I, K, and M of FIG. 2.

Bias for the gated amplifier circuits 24, 25, 26, 27 is set at such a point that the tubes are normally nonconductive, however, when one, typified by gated amplifier circuit 24, receives a short positive signal from sequencer 28 at such time that a positive enabling voltage level is also present at that point delivered from sequencer 18, conduction therein takes place to provide a positive output signal from the cathode thereof.

Since sequencer 18 provides a positive properly timed enabling voltage level to the typical gated amplifier circuit 24 only in response to a first negative pulse of waveform D in FIG. 2 and that positive signal at the gated amplifier circuit 24 is terminated by the last negative pulse of waveform D to produce the positive portions of waveform F as shown, it is apparent that the positive pulse from sequencer 28 in waveform G must be supplied in this interval for the gated amplifier circuit 24 to supply an output signal. The time duration of this interval for the gated amplifier circuit 24 is indicated in waveform F of FIG. 2. In waveforms F and G which show the time relationship between the signals supplied to gated amplifier circuit 24 it is seen that a time concidence occurs so that an output signal as shown by waveform N is delivered in response to the first pulse of waveform A.

The second pulse of waveform A is negative. For such a pulse, the differentiated negative portion occurs before the differentiated positive portion, hence the short positive pulse from sequencer 28 is applied to the gated amplifier circuit 25 in the interval of the negative portion of waveform H before the positive portion thereof starts in response to the second negative pulse of waveform D so that gated amplifier circuit 25 cannot conduct. It is therefore seen by waveform O that an output is not realized from a negative pulse such as the second pulse of waveform A.

The third and fourth pulses of waveform A are both positive, hence for each, the differentiated positive pulse occurs before the differentiated negative pulse so that the positive enabling voltage levels from sequencer 18, waveforms J and L, start before the occurrence of corresponding positive pulses from sequencer 28, waveforms K and M, respectively. This condition results in conduction by gated amplifier circuits 26 and 27 to produce the output signals of waveforms P and Q, respectively.

Following the fourth pulse of waveform A, the pulse of waveform B is applied to terminal 33–C of the reset circuit 33 which provides shaping as required to effect reset of the sequencers 18, 28 if they are not in the previously mentioned initial condition so that they are always maintained in a reference condition satisfactory to respond to a succeeding series of four pulses such as those of waveform A.

It is thus seen that the apparatus so far described is capable of distinguishing between negative and positive input pulses and providing separated output signals for input signals of selected polarity.

The signals thus obtained are non-coincident, that is, they are obtained one after another in the various lines. In certain situations it may be desirable to obtain the four values simultaneously. To this end, memory circuits are employed in an alternate manner. Every time the sequencer 18 reaches a condition such as that produced by the first pulse of waveform D it produces an output signal which is delivered to electronic switch 34 (FIG. 1). Electronic switch 34 may be a trigger circuit possessed of two stable states and connected to change from one state to the other each time an input signal is supplied thereto. This operation of switch 34 may thus take place with the leading edge of a first positive pulse of waveform A or the trailing edge of a first negative pulse. Such action is not objectionable because negative pulses are blocked and do not appear in the output. Such a first negative pulse would be missed due to the switching, however, one would be assured that such a negative pulse was present, and a correct output reading obtained.

Switch 34 as shown in FIG. 1 operates two series of gated amplifiers having sections 35–A, 35–B, 35–C, 35–D and 36–A, 36–B, 36–C, 36–D respectively, to deliver signals from gated amplifier circuits 24, 25, 26, 27 alternately to two groups of memory circuits 37, 38. Buffer amplifiers 35, 36 are placed in the output circuits from electronic switch 34 for isolation purposes. Gated amplifier sections 35–A, B, etc. and 36–A, B, etc. are connected and operate in the same manner as the previously discussed gated amplifier circuits 24, 25, 26, 27, that is, only when they are supplied with an enabling signal from electronic switch 34 are they responsive to output signals from the preceding signal source, gated amplifier circuits 24, 25, 26, 27. Since they receive signals from electronic switch 34 in an alternate manner, memory circuits 37, 38 receive signals for alternate groups of four signals such as those of waveform A.

When electronic switch 34 opens gated amplifier sections 35–A, 35–B, 35–C, 35–D to permit delivery of signals to the memory circuits 37, a simultaneous signal delivered through buffer amplifier 35 goes to memory circuits 38 to cause the return thereof to reference conditions ready for a subsequent group of signals. Since each memory circuit in the groups 37, 38 will require reset only if it received a pulse from the corresponding gated amplifier circuits 24, 25, 26, 27, only those storage circuits receiving signals (corresponding to positive pulses of waveform A) will experience reset. Suitable connection of the parallel output leads from memory circuits 37, 38 will then deliver output signals only from those memory stages of the circuits 37, 38 which experience reset.

With the block diagram of FIG. 1 thus described, details of specific circuits suitable to fill the blocks will now be described.

FIG. 3 shows details of the sequencers 18, 28 and the gated amplifier circuits 24, 25, 26, 27. Sequencer 18 contains the electron tubes 19–A, 19–B, 20–A, 20–B, 21–A, 21–B, 22–A, and 22–B and sequencer 28 contains the electron tubes 29–A, 29–B, 30–A, 30–B, 31–A, 31–B, 32–A and 32-B. The gated amplifier circuits are indicated by the tubes having corresponding numerals 24–A, 25–A, 26–A and 27–A.

Sequencer 18 as shown is composed of a group of four trigger circuits connected in a "ring" or "chain," that is, the anode of tube 19–B is connected to the grid of tube 20–B, the anode of 20–B to the grid of 21–B, the anode of 21–B to the grid of 22–B and the anode of 22–B back to the grid of tube 19–B. Point 15, which receives negative pulses of waveform D from pulse shaper 14 coincident with the leading edge of positive pulses and the trailing edge of negative pulses, is connected to the cathodes of the tubes 19–A, 20–A, 21–A, 22–A. The cathode resistances 19–C and 19–D have resistance values in the ratio of one to three, respectively. Each trigger circuit of necessity has two stable conductivity states and the reference condition of the entire chain can be selected with conduction in tubes 19–B, 20–A, 21–A and 22–A as initially established by the connection of the grid of tube 19–A to the anode of reset buffer tube 33–A which supplies negative pulses in response to the positive pulses of waveform B supplied to terminal 33–C. This same connection to the buffer tube serves to insure that if the sequencers are not in a known condition for the start of each group of pulses of waveform A they will be placed therein.

Similarly, sequencer 28 having tubes 29–A, 29–B, 30–A, 30–B, 31–A, 31–B, 32–A and 32–B is connected in chain fashion and a reference condition is selected for this discussion in which conduction is maintained by tubes 29–B, 30–A, 31–A, and 32–A. Negative pulses as shown by waveform E are supplied to the cathodes of tubes 29–A, 30–A, 31–A, and 32–A at point 17 from pulse shaper 16 of FIG. 1 coincident with the trailing edge of positive input pulses and the leading edge of negative input pulses (waveform A). The reference conductivity condition is assured by negative pulses supplied to the grid of tube 29–A from reset buffer tube 33–B in response to the positive pulses of waveform B supplied to terminal 33–C.

With the sequencers in their reference conditions ready to operate for the first pulse of a group of four, such as the first pulse in waveform A, conduction by tube 19–B holds the grid of tube 24–A at a low voltage so that conduction thereby is impossible even if a positive pulse is applied to the grid from the tube 29–B. A first negative pulse applied to point 15 will lower the potential at the cathode of tube 19–A so that tube 19–A will be brought to conduction and tube 19–B cut-off thereby raising the potential at the grid of tube 24–A. At the same time tube 20–B will be brought to conduction, lowering the potential of the grid of tube 25–A. If this action is brought about by the leading edge of a positive input pulse such as is shown by waveform A, it will be immediately followed by a positive pulse from the anode of tube 29–B as the trailing edge of the positive input pulse of waveform A initiates conduction in tube 29–A. With the positive pulse from tube 29–B applied to tube 24–A while tube 19–B is non-conductive, tube 24–A is brought to conduction to produce a positive pulse signal at the cathode thereof.

The appropriate edge of the second pulse of waveform A by its application to the cathode of tube 20–A, for example, brings the second stage of each chain to condition with the tubes 20–A and 30–A conductive, a condition in which the stage is susceptible to triggering by a negative pulse applied to the cathode.

If the input pulse of waveform A is negative such as is shown by the second pulse of waveform A, the corresponding stage of sequencer 28 (tube 30–B) will be cut-off by the leading edge of the pulse to produce a differentiated positive pulse at the grid of tube 25–A. The positive portion of the gating signal from the corresponding stage of sequencer 18 (tube 20–B), however, will not resume until the trailing edge of this second negative input pulse. Therefore tube 25–A will not attain conduction to produce an output signal.

This same action proceeds down the chain with the corresponding gated amplifier tubes 26–A and 27–A delivering output signals only when the input (waveform A) signals are positive in polarity.

When the last tube of each chain (tubes 22–B, 32–B) is cut off in response to an edge of the fourth pulse (such as in waveform A), the resultant positive pulse produced at the anode thereof is communicated back to the first stage thereby rendering tubes 19–B and 29–B conductive, returning the chain to the original reference condition. With the chain in this condition, negative pulses supplied to the grids of tubes 19–A and 29–B in response to the pulse of waveform B will be ineffective. If the chain is not in the original reference condition, however, the negative pulses from reset buffer tubes 33–A and 33–B will cause the return thereof to the reference condition.

Figure 4:
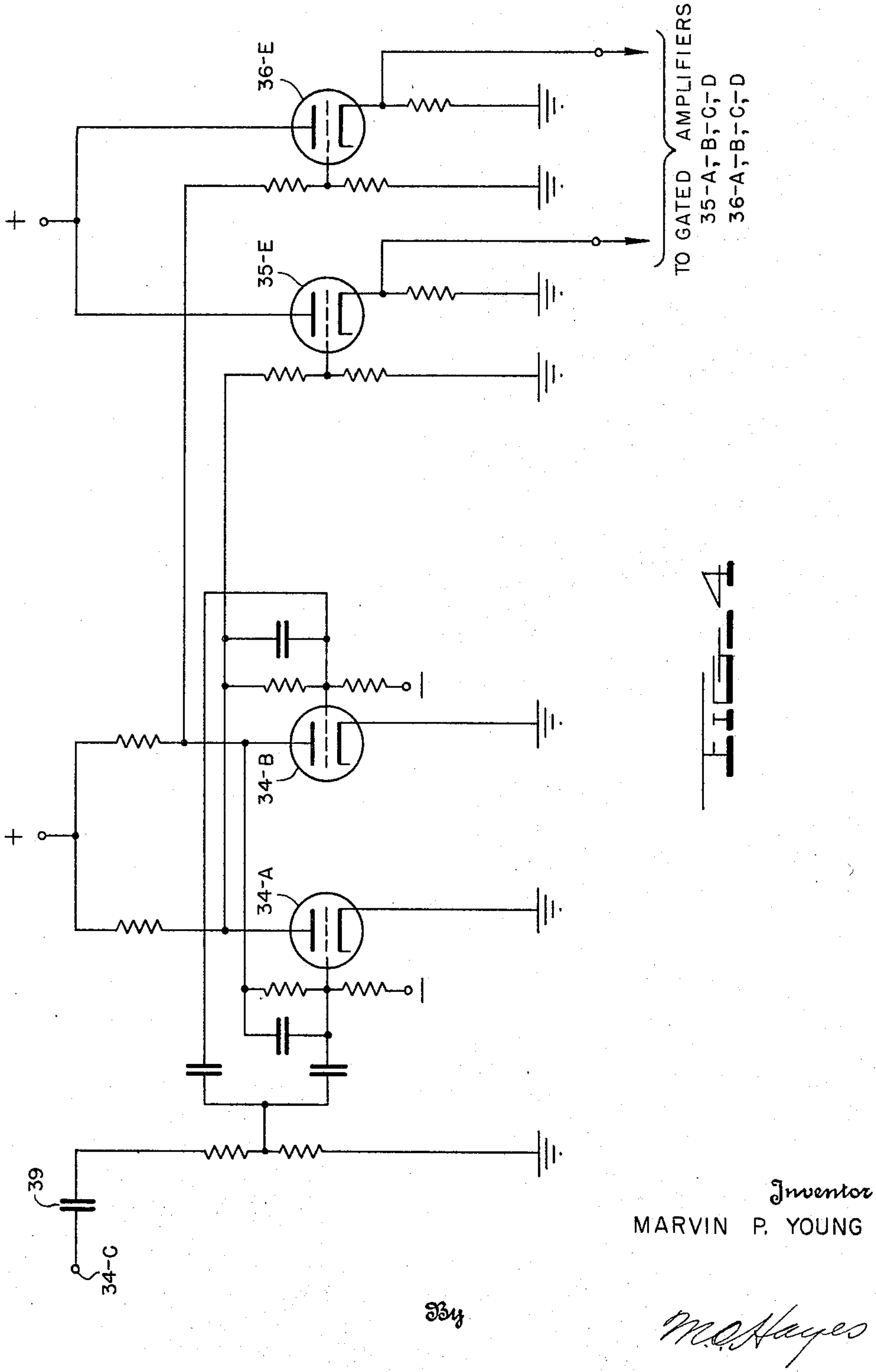

Details of a suitable time sharing control electronic switch 34 and buffer amplifiers 35, 36 are shown in FIG. 4. Electronic switch 34 has two electron tubes 34–A and 34–B connected as a trigger circuit having two stable states. Input signals are supplied to terminal 34–C from the anode of tube 19–A of FIG. 3 and are differentiated in a short time constant coupling circuit including capacitance 39. The tubes 34–A and 34–B are biased to such an extent that only the negative differentiated pulses are effective to operate electronic switch 34. These negative pulses are produced at the instant of time at which tube 19–A becomes conductive as a result of the appropriate edge of a first pulse supplied to the common cathode juncture point 15.

Connected to the anodes of tubes 34–A, 34–B are the buffer amplifiers having tubes 35–E and 36–E which are the principal components of the buffer amplifiers 35 and 36 in the block diagram of FIG. 1. The circuits of these tubes are of cathode follower type, with the outputs obtained in push-pull fashion at the cathodes.

Figure 5:
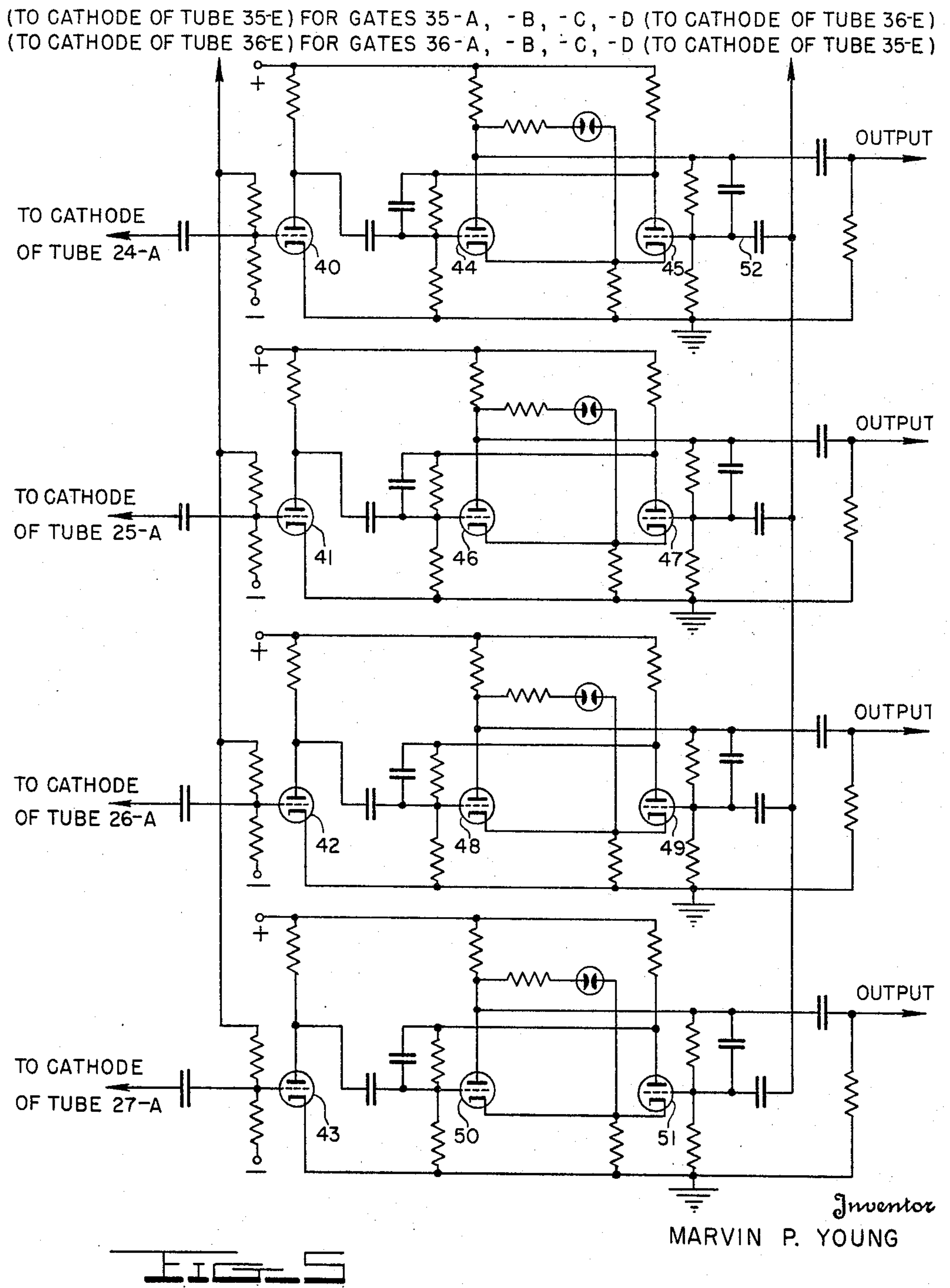

Circuit details of the gated amplifier sections 35–A, –B, –C, –D and 36–A, –B, –C, –D and the storage circuits 37, 38 are shown in FIG. 5. Inasmuch as the circuits of the gated amplifier sections 35–A, –B, –C, –D and the memory circuits 37 can be the same as the gated amplifier sections 36–A, –B, –C, –D and the memory circuit 38, only one showing has been made with appropriate notations being made on the drawing as to the connections and subsequently in this discussion.

Gated amplifier sections are indicated in FIG. 5 by the components associated with the tubes 40, 41, 42, 43. Typically the grids are separately supplied with pulse type signals from the cathodes of tubes 24–A, 25–A, 26–A, 27–A of FIG. 3, respectively, and in parallel with a gating signal from an appropriate cathode of a buffer amplifier of FIG. 4 typically from the cathode of tube 35–E.

Tubes 40, 41, 42, 43 are heavily biased so that they are not responsive to signals from the tubes 24–A, 25–A, 26–A, 27–A unless a positive gating signal is also supplied typically from the cathode of tube 35–E. When such a condition is present, positive signals from tubes 24–A, 25–A, 26–A, 27–A will render the appropriate ones of tubes 40, 41, 42, 43 conductive to produce negative pulses. The negative pulses are applied to trigger circuits typified by that having tubes 44–45 and in which tube 44 is assumed initially conductive. Tube 44 will consequently be cut-off in response to a positive pulse in the first pulse position of waveform A. Similarly for the pulses in the third and fourth positions of this waveform, the trigger circuits with tubes 48–49, and 50–51 will be operated and the trigger circuit having tubes 46–47 will remain unchanged because the pulse in the second position of waveform A is negative.

As electronic switch 34 (FIG. 1) changes state in response to a subsequent negative pulse applied to terminal 34–C (FIG. 4) from sequencer 18 at the instant tube 19–A becomes conductive responsive to a first pulse. The return to conduction of tube 34–A drops the potential at the cathode of tube 35–E blocking the gated amplifier tubes 40, 41, 42, 43 connected thereto for further signals. The signals thus stored in the trigger circuits 44–45, etc. are retained until the occurrence of a positive edge of a first pulse of the second succeeding group of four pulses at which time the tube 34–B is rendered conductive and a negative signal supplied through tube 36–E via short-time constant coupling circuits to the grids of tubes 45, 47, 49, 51. Typically the capacitance 52 is an element of one of these short time-constant coupling circuits. The negative pulses are ineffective when the typical tube 45 is nonconductive, however, if tube 45 had been rendered conductive by a previous negative pulse to tube 44 from tube 40, the trigger circuit will be returned to the original state with tube 44 conductive. Resulting variations at the anode of typical tube 45 can be supplied to an output circuit through a differentiator type coupling network. The four parallel output circuits will thus simultaneously provide negative pulses if the corresponding pulse positions in waveform A contain positive pulses and will provide no output whatever when the pulse positions contain negative pulses.

From the foregoing discussion it is apparent that considerable modification of the features of the present invention is possible without exceeding the scope of the invention which is defined in the appended claims.

The invention described herein may be manufactured and used by or for the Government of the United States of America for governmental purposes without the payment of any royalties thereon or therefor.

What is claimed is:

1. A signal translating device comprising, differentiating means fed by incoming pulses for producing from each incoming pulse a pair of pulses of opposite polarity, a plurality of pulse transmission channels, means instantly responsive to differentiated pulses of a first polarity for unblocking said transmission channels in succession, and means responsive to the differentiated pulses of the opposite polarity for applying an input pulse to each of said transmission channels in succession.

2. A signal translating device comprising, differentiating means fed by incoming pulses for producing a pair of pulses of opposite polarity for each incoming pulse, a plurality of pulse transmission channels, means instantly responsive to differentiated pulses of a first polarity for unblocking said transmission channels in succession, means responsive to the differentiated pulses of the opposite polarity for applying an input pulse to each of said transmission channels in succession, and signal storage means fed by said transmission channels to store the signals emitted therefrom and thereafter release the same as a simultaneous output quantity.

3. A signal translating device comprising, differentiating means fed by incoming pulses for producing a pair of pulses of opposite polarity for each incoming pulse, a plurality of pulse delivery channels, first and second sequentially operative timing circuits having equal numbers of stages, said timing circuits responsive respectively to differentiated pulses of a first and second polarity operative to unblock said delivery channels in succession independency on the relative time occurrence of the differentiated pulses of each pair of pulses of opposite polarity, and means responsive to the differentiated pulses of the opposite polarity for applying an input pulse to each of said transmission channels in succession.

4. A signal translating device comprising, differentiating means fed by incoming pulses for producing a pair of pulses of opposite polarity for each incoming pulse, a plurality of pulse transmission channels, a sequentially operative timing circuit having a selected number of stages responsive to differentiated pulses of a first polarity for unblocking said transmission channels in succession, and a second sequentially operative timing circuit having the same number of stages as the first timing circuit responsive to differentiated pulses of the opposite polarity for applying an input pulse to each of said transmission channels in succession.

5. A data transforming system operative with an input signal wherein information is contained as negative and positive polarity pulses to produce output signals of one polarity responsive to input signals of one polarity contained in one line comprising, an input signal path, first signal delivery means connected to the input path for delivering primary signals in response to the leading edge of positive input pulses and the trailing edge of negative input pulses, second signal delivery means connected to the input path for delivering second signals in response to the other edges of input pulses, a first sequentially operative timing circuit connected to one of the signal delivery means responsive to the signal output therefrom to produce a sequence of gating signals in separate lines, a second sequentially operative timing circuit connected to the other signal delivery means responsive to the signal output therefrom to produce a sequence of enabling signals in separate lines, and a plurality of gated amplifiers connected to the first and second timing circuits responsive to the gating and enabling signals to produce output signals when the gating signal from one input pulse occurs with selected time relationship to the enabling signal therefrom.

6. A data transforming system operative with a recurrent input signal having groups of pulses wherein information is contained as negative and positive pulses to produce accurately controlled signals of one polarity responsive to input signals of one polarity comprising, a first timing circuit sequentially operative to initiate separate gating signals in response to the leading edge of pulses of a first polarity and trailing edges of pulses of a second, opposite, polarity, a second timing circuit sequentially operative to produce separate short duration enabling signals in response to the trailing edges of pulses of the first polarity and leading edges of pulses of the second polarity, a plurality of gating amplifiers connected individually to corresponding stages of the timing circuits operative to produce individual output signals only when an enabling signal occurs after the corresponding gating signal, first and second memory circuits connected to the gating amplifiers operative to store the sequentially obtained information from the gated amplifiers, and timing circuit controlled switching means operative to store gating amplifier information to the first and second memory circuits alternately for alternate recurrent input signals.

References Cited by the Examiner

UNITED STATES PATENTS

| | | | |
|---|---|---|---|
| 2,365,450 | 12/1942 | Bliss | 178—50 |
| 3,409,229 | 10/1946 | Smith et al. | 250—27 |
| 3,482,932 | 9/1949 | Pyatt et al. | 250—27 |

ARTHUR GAUSS, *Primary Examiner.*

L. MILLER ANDRUS, *Examiner.*

R. H. EPSTEIN, *Assistant Examiner.*